(12) United States Patent
Chrabieh

(10) Patent No.: US 8,428,175 B2
(45) Date of Patent: Apr. 23, 2013

(54) QUADRATURE MODULATION ROTATING TRAINING SEQUENCE

(75) Inventor: Rabih Chrabieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 930 days.

(21) Appl. No.: 11/684,566

(22) Filed: Mar. 9, 2007

(65) Prior Publication Data

US 2008/0219338 A1 Sep. 11, 2008

(51) Int. Cl.
*H04L 27/00* (2006.01)

(52) U.S. Cl.
USPC .......................................................... 375/295

(58) Field of Classification Search .................. 375/219, 375/231, 260, 295, 296, 298, 308, 350; 455/73, 455/78, 83, 313, 314, 315
See application file for complete search history.

(56) References Cited

U.S. PATENT DOCUMENTS

| | | | |
|---|---|---|---|
| 5,852,630 A | | 12/1998 | Langberg et al. |
| 5,886,584 A | * | 3/1999 | Tanai et al. .................... 332/103 |
| 5,920,808 A | | 7/1999 | Jones et al. |
| 5,960,040 A | | 9/1999 | Cai et al. |
| 6,009,073 A | | 12/1999 | Kaneko |
| 6,166,622 A | | 12/2000 | Hosur et al. |
| 6,259,928 B1 | | 7/2001 | Vembu |
| 6,404,824 B1 | | 6/2002 | Bell et al. |
| 6,493,396 B1 | | 12/2002 | Nguyen et al. |
| 7,020,226 B1 | | 3/2006 | Kirkland |
| 7,058,368 B2 | | 6/2006 | Nicholls et al. |
| 7,113,559 B2 | | 9/2006 | Baas et al. |
| 7,233,629 B2 | | 6/2007 | Auranen |
| 7,248,625 B2 | | 7/2007 | Chien |
| 7,251,291 B1 | * | 7/2007 | Dubuc et al. .................. 375/296 |
| 7,313,203 B2 | | 12/2007 | Tubbax et al. |
| 7,366,255 B1 | | 4/2008 | Hwang et al. |
| 7,385,617 B2 | | 6/2008 | Tahat |

(Continued)

FOREIGN PATENT DOCUMENTS

| | | |
|---|---|---|
| CN | 1579063 A | 2/2005 |
| CN | 1682509 A | 10/2005 |

(Continued)

OTHER PUBLICATIONS

International Search Report, PCT/US2008/056321, International Search Authority, European International Office, Apr. 12, 2008.

(Continued)

*Primary Examiner* — David C. Payne
*Assistant Examiner* — Syed Haider
(74) *Attorney, Agent, or Firm* — Qualcomm Patent Group; James H. Yancey, Jr.

(57) ABSTRACT

A system and method are provided for transmitting a rotating training sequence. A rotating training signal is generated in quadrature modulation transmitter. The rotating training signal includes training information sent via an in-phase (I) modulation path, as well as training information sent via a quadrature (Q) modulation path. The rotating training signal may be generated by initially sending training information via the I modulation path, and subsequently sending training information via the Q modulation path. The training information sent via the I modulation path may include a first symbol having a reference phase (e.g., 0 degrees or 180 degrees). Then, the training information sent via the Q modulation path would include a second symbol having a phase that is ±90 from the reference phase.

18 Claims, 11 Drawing Sheets

U.S. PATENT DOCUMENTS

| | | | |
|---|---|---|---|
| 7,415,074 B2 | 8/2008 | Seto et al. | |
| 7,443,783 B2 | 10/2008 | DeChamps et al. | |
| 7,453,794 B2 | 11/2008 | Fang et al. | |
| 7,529,306 B2 | 5/2009 | Brotjie et al. | |
| 7,626,921 B2 | 12/2009 | Egashira et al. | |
| 7,697,620 B2 | 4/2010 | Kroeger et al. | |
| 8,081,695 B2 | 12/2011 | Chrabieh et al. | |
| 2002/0012380 A1 | 1/2002 | Hottinen et al. | |
| 2002/0191713 A1* | 12/2002 | McVey | 375/308 |
| 2003/0072254 A1 | 4/2003 | Ma et al. | |
| 2003/0156656 A1* | 8/2003 | Ojard et al. | 375/295 |
| 2004/0095899 A1* | 5/2004 | Murakami et al. | 370/310 |
| 2004/0184398 A1 | 9/2004 | Walton et al. | |
| 2004/0264583 A1* | 12/2004 | Ahmed | 375/259 |
| 2005/0025113 A1 | 2/2005 | Lestable | |
| 2005/0058102 A1* | 3/2005 | Santhoff et al. | 370/335 |
| 2005/0070322 A1 | 3/2005 | Tayloe et al. | |
| 2005/0213676 A1* | 9/2005 | Stopler | 375/260 |
| 2005/0276354 A1 | 12/2005 | Su et al. | |
| 2005/0281239 A1 | 12/2005 | Williams | |
| 2005/0283715 A1 | 12/2005 | Sutivong et al. | |
| 2006/0104341 A1* | 5/2006 | Magee et al. | 375/231 |
| 2006/0132338 A1* | 6/2006 | Katakura et al. | 341/112 |
| 2006/0198461 A1 | 9/2006 | Hayase | |
| 2006/0203795 A1* | 9/2006 | Welborn et al. | 370/345 |
| 2007/0121757 A1* | 5/2007 | Chu et al. | 375/296 |
| 2007/0223393 A1 | 9/2007 | Urushihara et al. | |
| 2008/0037410 A1 | 2/2008 | Egashira et al. | |
| 2008/0130779 A1 | 6/2008 | Levi et al. | |
| 2008/0140770 A1 | 6/2008 | DelloStritto et al. | |
| 2008/0219371 A1 | 9/2008 | Chrabieh | |
| 2008/0219386 A1 | 9/2008 | Chrabieh et al. | |
| 2008/0240289 A1 | 10/2008 | Murakami et al. | |
| 2009/0213949 A1 | 8/2009 | Javaudin | |
| 2012/0039421 A1 | 2/2012 | Chrabieh et al. | |

FOREIGN PATENT DOCUMENTS

| | | |
|---|---|---|
| CN | 1697432 A | 11/2005 |
| EP | 0206203 A2 | 12/1986 |
| EP | 0246055 A2 | 11/1987 |
| EP | 1501251 A2 | 1/2005 |
| JP | 2001119364 A | 4/2001 |
| JP | 2004173281 A | 6/2004 |
| JP | 2005252631 A | 9/2005 |
| JP | 2005527152 A | 9/2005 |
| JP | 2006186581 A | 7/2006 |
| JP | 2006245871 A | 9/2006 |
| JP | 2006526348 A | 11/2006 |
| JP | 2007060106 A | 3/2007 |
| JP | 2007142674 A | 6/2007 |
| JP | 2007180618 A | 7/2007 |
| JP | 2007208654 A | 8/2007 |
| JP | 2008017145 A | 1/2008 |
| JP | 2008236704 A | 10/2008 |
| JP | 2010521125 | 6/2010 |
| RU | 2125344 | 1/1999 |
| RU | 2154897 C2 | 8/2000 |
| RU | 2233032 C2 | 7/2004 |
| RU | 2235429 | 8/2004 |
| RU | 2235435 C2 | 8/2004 |
| TW | I261976 B | 9/2006 |
| TW | I267263 B | 11/2006 |
| TW | I268672 | 12/2006 |
| TW | I269540 B | 12/2006 |
| WO | WO9200639 A1 | 1/1992 |
| WO | WO9631952 A1 | 10/1996 |
| WO | WO0079710 A1 | 12/2000 |
| WO | 0131867 | 5/2001 |
| WO | WO0191318 A1 | 11/2001 |
| WO | WO03101064 | 12/2003 |
| WO | 2004025918 | 3/2004 |
| WO | WO2004107697 A1 | 12/2004 |
| WO | 2005094028 | 10/2005 |
| WO | WO2008112588 | 9/2008 |

OTHER PUBLICATIONS

Written Opinion, PCT/US2008/056321, International Search Authority, European Patent Office, Apr. 12, 2008.

International Search Report, PCT/US2008/056327, International Search Authority, European Patent Office, Apr. 12, 2008.

Written Opinion, PCT/US2008/056327, International Search Authority, European Patent Office, Apr. 12, 2008.

International Search Report, PCT/US2008/056333, International Search Authority, European Patent Office, Nov. 20, 2008.

Written Opinion, PCT/US2008/056333, International Search Authority, European Patent Office, Nov. 20, 2008.

Bagheri et al., "Compensation Schemes and Performance Analysis of IQ Imbalances in OFDM Receivers," IEEE Transactions on Signal Processing, Aug. 1, 2005, pp. 3257-3268, vol. 53, No. 8, IEEE Service Center, New York, NY, US, XP011136506.

Xing et al., "Frequency Offset and I/Q Imbalance Compensation for Direct-Conversion Receivers," IEEE Transactions on Wireless Communications, Mar. 1, 2005, pp. 673-680, vol. 4, No. 2, IEEE Service Center, Piscataway, NJ, US, XP011129220.

Guanbin Xing et al: "Frequency offset and i/q imbalance compensation for OFDM direct-conversion receivers" 2003 IEEE International Conference on Acoustics, Speech, and Signal Processing (ICASSP), vol. 4, 6. pp. IV_708-IV_711, XP010641258.

Jan Tubbax et al.: "Compensation of IQ imbalance in OFDM systems," pp. 3403-3407, IEEE publications 2003.

International Search Report—PCT/US20081056329, International Search Authority—European Patent Office—Jun. 24, 2008.

Written Opinion—PCT/US2008/056329, International Search Report—European Patent Office—Jun. 24, 2008.

Giugno L. et al.: "Low-Complexity Gain and Phase I/Q Mismatch Compensation using Orthogonal Pilot Sequences," EUSIPCO Sep. 2006.

Windisch M. et al.: "Preamble Design for an Efficient I/O Imbalance Compensation in OFDM Direct-Conversion Receivers," Proc. 10th Int. OFDM Workshop (InOWo'05), Aug. 2005.

Translation of Office Action in Japan application 2009-553707 corresponding to U.S. Appl. No. 11/755,719, citing JP2006245871, JP2001119364, US20050180518, Bagheri R et al Compensation schemes pp. 3257-3268 year 2005, US20040223561, JP2008017145, JP2007208654, JP2007180618, JP2007142674, JP2010521125, JP2007060106, JP2004173281 and JP2008236704 dated Mar. 29, 2011.

Translation of Office Action in Rusian application 2009137384 corresponding to U.S. Appl. No. 11/684,566, citing WO2004025918, US20040223561, US20020012380 and RU2125344 dated Mar. 31, 2011.

Translation of Office Action in Russian application 2009137373 corresponding to U.S. Appl. No. 11/853,809, citing US20050163244, US20030072254 and RU2235429 dated Feb. 25, 2011.

* cited by examiner

QUADRATURE MODULATION ROTATING TRAINING SEQUENCE

BACKGROUND

1. Field

This invention relates generally to the modulation of communications and, more particularly, to systems and methods for generating a quadrature modulation rotating training signal for use in the training of receiver channel estimates.

2. Background

FIG. 1 is a schematic block diagram of a conventional receiver front end (prior art). A conventional wireless communications receiver includes an antenna that converts a radiated signal into a conducted signal. After some initial filtering, the conducted signal is amplified. Given a sufficient power level, the carrier frequency of the signal may be converted by mixing the signal (down-converting) with a local oscillator signal. Since the received signal is quadrature modulated, the signal is demodulated through separate I and Q paths before being combined. After frequency conversion, the analog signal may be converted to a digital signal, using an analog-to-digital converter (ADC), for baseband processing. The processing may include a fast Fourier transform (FFT).

There are a number of errors that can be introduced into the receiver that detrimentally affect channel estimations and the recovery of the intended signal. Errors can be introduced from the mixers, filters, and passive components, such as capacitors. The errors are exacerbated if they cause imbalance between the I and Q paths. In an effort to estimate the channel and, thus, zero-out some of these errors, communication systems may use a message format that includes a training sequence, which may be a repeated or predetermined data symbol. Using an Orthogonal Frequency Division Multiplexing (OFDM) system for example, the same IQ constellation point may be transmitted repeatedly for each subcarrier.

In an effort to save power in portable battery-operated devices, some OFDM systems use only a single modulation symbol for training. For example, a unique direction in the constellation (e.g., the I path) is stimulated, while the other direction (e.g., the Q path) is not. The same type of unidirectional training may also be used with pilot tones. Note: scrambling a single modulation channel with ±1 does not rotate the constellation point, and provides no stimulation for the quadrature channel.

In the presence of quadrature path imbalance, which is prevalent in large bandwidth systems, the above-mentioned power-saving training sequence results in a biased channel estimate. A biased channel estimate may align the IQ constellation well in one direction (i.e., the I path), but provide quadrature imbalance in the orthogonal direction. It is preferable that any imbalance be equally distributed among the two channels.

FIG. 2 is a schematic diagram illustrating quadrature imbalance at the receiver side (prior art). Although not shown, transmitter side imbalance is analogous. Suppose that the Q path is the reference. The impinging waveform is $\cos(wt+\theta)$, where $\theta$ is the phase of the channel. The Q path is down-converted with $-\sin(wt)$. The I path is down-converted with $(1+2\epsilon)\cos(wt+2\Delta\phi)$. $2\Delta\phi$ and $2\epsilon$ are hardware imbalances, respectively a phase error and an amplitude error. The low pass filters $H_I$ and $H_Q$ are different for each path. The filters introduce additional amplitude and phase distortion. However, these additional distortions are lumped inside $2\Delta\phi$ and $2\epsilon$. Note: these two filters are real and affect both +w and -w in an identical manner.

Assuming the errors are small:

$$(1+2\epsilon)\cos(wt+2\Delta\phi) \approx (1+2\epsilon)\cos(wt)-2\Delta\phi.\sin(wt)$$

The first component on the right hand side, $\cos(wt)$, is the ideal I path slightly scaled. The second component, $-2\Delta\phi.\sin(wt)$, is a small leakage from the Q path. After down-conversion of the impinging waveform:

in the I path: $(1+2\epsilon)\cos(\theta)+2\epsilon.\sin(\theta)$.
in the Q path: $\sin(\theta)$.

The errors result in the misinterpretation of symbol positions in the quadrature modulation constellation, which in turn, results in incorrectly demodulated data.

SUMMARY

Wireless communication receivers are prone to errors caused by a lack of tolerance in the hardware components associated with mixers, amplifiers, and filters. In quadrature demodulators, these errors can also lead to imbalance between the I and Q paths.

A training signal can be used to calibrate receiver channel errors. However, a training signal that does not stimulate both the I and Q paths does not address the issue of imbalance between the two paths.

Accordingly, a method is provided for transmitting a quadrature modulated rotating training sequence. A rotating training signal is generated by a quadrature modulation transmitter. The rotating training signal includes training information sent via an in-phase (I) modulation path, as well as training information sent via a quadrature (Q) modulation path. Quadrature modulated communication data is generated either simultaneous with, or subsequent to the training signal. The rotating training signal and quadrature modulated communication data are transmitted.

For example, the rotating training signal may be generated by initially sending training information via the I modulation path, and subsequently sending training information via the Q modulation path. More explicitly, the training information sent via the I modulation path may include a first symbol having a reference phase (e.g., 0 degrees or 180 degrees). Then, the training information sent via the Q modulation path would include a second symbol having a phase that is ±90 from the reference phase.

Additional details of the above-described method, a system for generating a rotating training signal, and other variations of the invention are presented below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Figure 3:
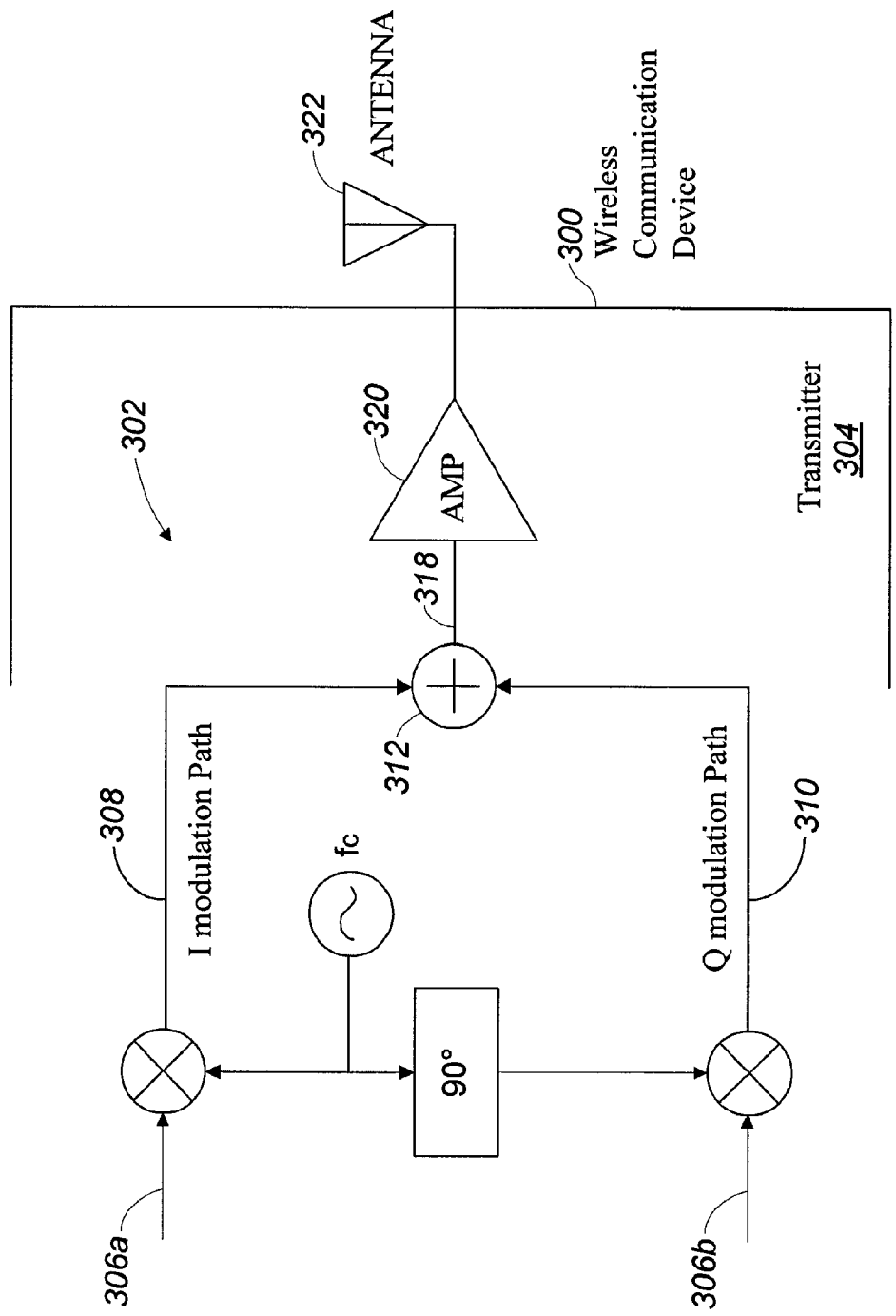
FIG. 3 is a schematic block diagram of a wireless communications device, with a system for transmitting a rotating training sequence.

FIG. 3 is a schematic block diagram of a wireless communications device 300, with a system for transmitting a rotating training sequence. The system 302 comprises a radio frequency (RF) transmitter 304 having an input on lines 306a and 306b to accept information, an in-phase (I) modulation path 308, a quadrature (Q) modulation path 310, and a combiner 312 for combining signals from the I and Q modulation paths, 308 and 310, respectively. Although an RF transmitter is used as an example to illustrate the invention, it should be understood that the invention is applicable to any communication medium (e.g., wireless, wired, optical) capable of carrying quadrature modulated information. The I and Q paths may alternately be referred to as I and Q channels. The combined signals are supplied on line 318 to amplifier 320, and finally to antenna 322, where the signals are radiated. The transmitter 304 can be enabled to send a message with a rotating training signal. A rotating training signal, which may also be referred to as an quadrature balanced training signal, balanced training signal, balanced training sequence, or unbiased training signal includes training information sent via the I modulation path 308 and training information sent via the Q modulation path 310. The transmitter 304 also sends quadrature modulated (non-predetermined) communication data. In one aspect, the quadrature modulated communication data is sent subsequent to sending the rotating training signal. In another aspect, the training signal is sent concurrently with the communication data in the form of pilot signals. The system is not limited to any particular temporal relationship between the training signal and the quadrature modulated communication data.

FIGS. 4A through 4D are diagrams depicting a training signal with quadrature modulated communication data. Considering both FIGS. 3 and 4A, in one aspect the transmitter 304 sends the rotating training signal by initially sending training information via the I modulation path 308 and subsequently sending training information via the Q modulation path 310. That is, the training signal includes information, such as a symbol or a repeated series of symbols sent only via the I modulation path 308, followed by the transmission of a symbol or repeated series of symbols sent only via the Q modulation path 310. Alternately but not shown, training information may be sent initially via the Q modulation path 310, and subsequently via the I modulation 308.

In the case of single symbols being sent alternately through the I and Q paths, it is more likely that transmitter sends a rotating training signal with predetermined training information via the I and Q modulation paths. For example, the first symbol may always be (1,0) and the second symbol may always be (0,1).

The above-mentioned rotating training signal, which initially sends rotating training signal via (just) the I modulation path, may be accomplished by energizing the I modulation path 308, but not energizing the Q modulation path 310. Then, the transmitter sends the rotating training signal via the Q modulation path by energizing the Q modulation path 310, subsequent to sending training information via the I modulation path.

Figure 5A:
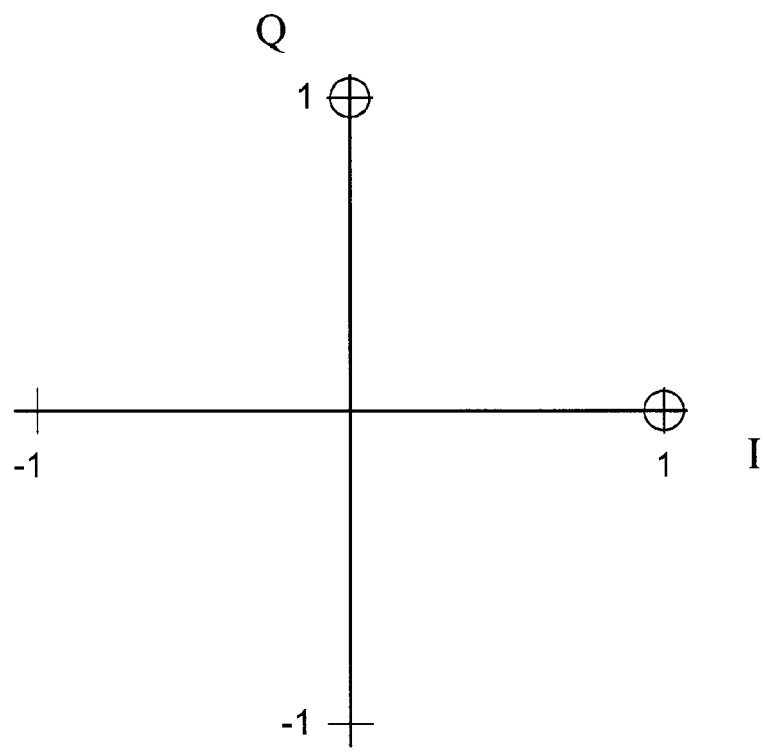
FIGS. 5A and 5B are diagrams of the rotating training symbols as represented in a quadrature constellation.
Figure 5B:
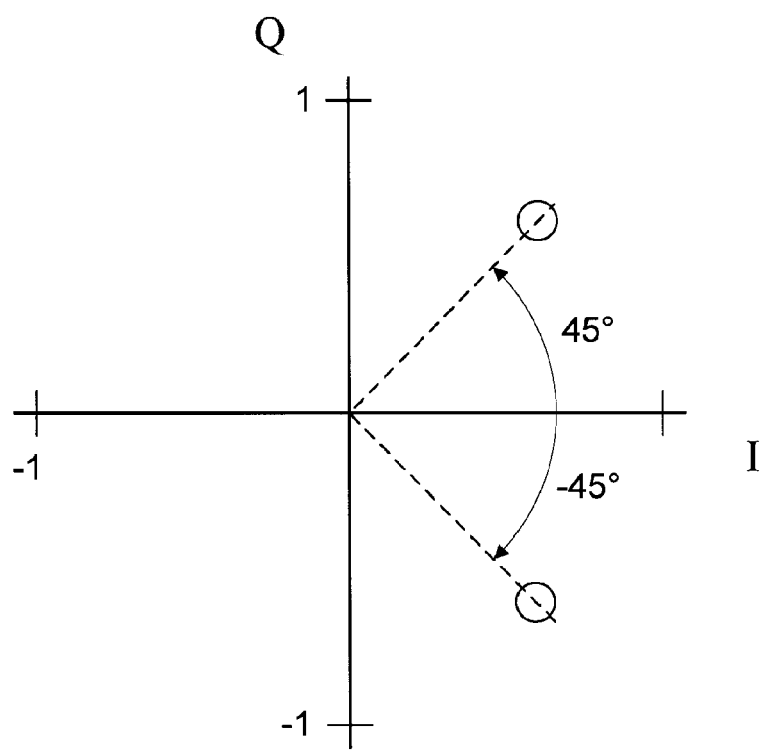

FIGS. 5A and 5B are diagrams of the rotating training symbols as represented in a quadrature constellation. Considering FIGS. 3, 4A, and 5A, the transmitter 304 generates the rotating training signal by sending a first symbol having a reference phase via the I modulation path 308, and sending a second symbol having a phase that is either (reference phase+ 90 degrees) or the (reference phase−90 degrees), via the Q modulation path 310. For example, the reference phase of the first symbol may be 0 degrees, in which case the phase of the second symbol might be 90 degrees (as shown) or −90 degrees (not shown).

However, it is not necessary to simply alternate the transmission of symbols through the modulations paths 308/310 to obtain symbol rotation, as described above. For example, the first symbol may be sent through (just) the I (or Q) modulation path, and the transmitter may send training information simultaneously through both the I and Q modulation paths, and combine I and Q modulated signals to supply the second symbol. As another example, the transmitter may send the training information simultaneously through both the I and Q modulation paths, and combine I and Q modulated signals to supply the first symbol, while the second symbol is obtained by using just the Q (or I) modulation path.

Figure 4A:
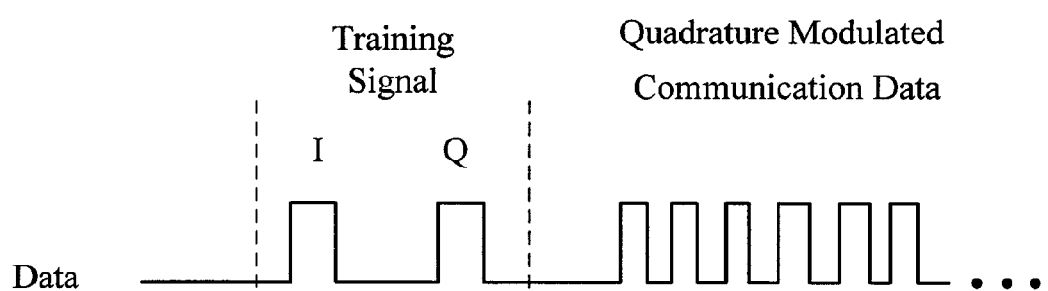
FIGS. 4A through 4D are diagrams depicting a training signal with quadrature modulated communication data.
Figure 4B:
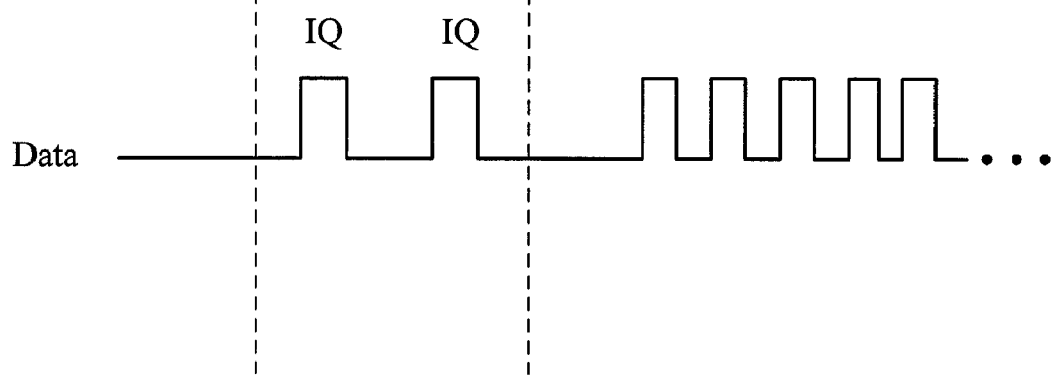

The training symbols can also be rotated by supplying symbols, each with both I and Q components, as is conventionally associated with quadrature modulation, see FIG. 4B. That is, the transmitter 304 may send training information simultaneously through both the I and Q modulation paths 308/310, and combine I and Q modulated signals to supply the first symbol on line 318. For example, the first symbol may occupy a position at 45 degrees in the constellation, see FIG. 5B. Likewise, the transmitter would send training information simultaneously through both the I and Q modulation paths 308/310, and combine I and Q modulated signals to supply the second symbol. For example, the second symbol may be rotated to a position of −45 degrees, which is orthogonal to the first symbol (45 degrees).

Thus, in one aspect a rotating training symbol minimally includes a sequence of two symbols with a phase difference of 90 degrees. However, the system is not limited to a system that uses only two symbols. Generally, an even number of symbols is preferred so that half the symbols may be generated by using the I modulation path, and the other half generated using the Q modulation path. However, in sequences of longer than two symbols, a 90 degree rotation need not be performed between every symbol. That is, there is no particular order of phase between symbols. In one aspect, half the symbols are different from the other half by 90 degrees, on average. For example, an Ultra Wideband (UWB) system uses 6 symbols transmitted prior to the transmission of communication data or a beacon signal. Therefore, 3 consecutive symbols may be generated on I modulation path followed by 3 consecutive on Q modulation path. Using this process, the Q channel need only be activated briefly, for 3 symbols, before returning to sleep.

Figure 6:
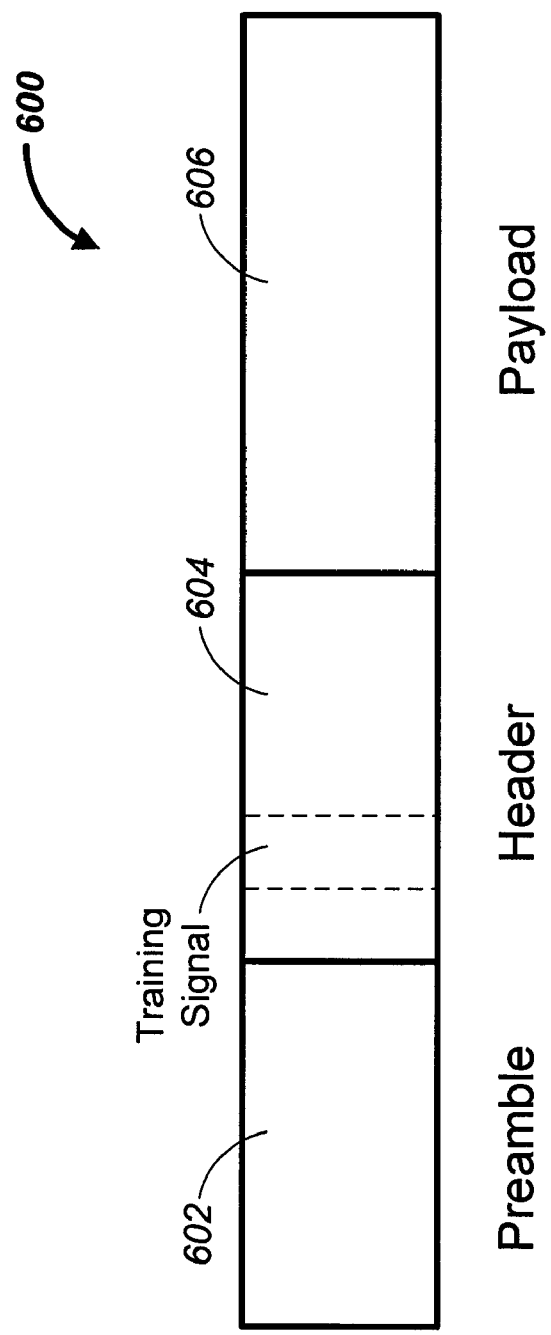
FIG. 6 is a diagram depicting an exemplary framework for carrying a message with a rotating training signal.

FIG. 6 is a diagram depicting an exemplary framework for carrying a message with a rotating training signal. Considering FIGS. 3 and 6, in one aspect the transmitter 304 is operated in accordance with the OSI model. In this typically 7-layer model, the transmitter is associated with the physical (PHY) layer. As shown, the transmitter 304 sends a physical layer (PHY) signal 600 including a preamble 602, header 604, and payload 606. The transmitter sends the rotating training signal in the PHY header 604, and sends the quadrature modulated communication data in the PHY payload 606.

Many communication systems transmit beacon information at relatively slow quadrature modulated communication data rates, while reserving higher data rates for the transfer of (non-predetermined) information. Networks operating in accordance with IEEE 802.11 protocols are an example of these systems. Since many wireless communication devices are battery-operated, it is desirable that these units operate in a "sleep" mode when they are not actually transferring information. For example, master units or access points may broadcast relatively simple, low data rate beacon signals until a sleeping unit responds.

Pilot signals may be considered as a special case of training signals. While training signals are transmitted before the data, typically using every subcarrier (all N frequencies in the communication bandwidth), pilot tones are transmitted together with the quadrature modulated communication data on a subset of (reserved) frequencies. In system using OFDM, such as UWB, this reserved set is comprised of pilot tones. That is, the pilot tones are associated with P frequencies, and the data is associated with the remaining N-P frequencies.

Training signals and pilot signals are similar in that the information content of transmitted data is typically predetermined or "known" data that permits the receiver to calibrate and make channel measurements. When receiving communication (non-predetermined) data, there are 3 unknowns: the data itself, the channel, and noise. The receiver is unable to calibrate for noise, since noise changes randomly. Channel is a measurement commonly associated with delay and multipath. For relatively short periods of time, the errors resulting from multipath can be measured if predetermined data is used, such as training or pilot signals. Once the channel is known, this measurement can be used to remove errors in received communication (non-predetermined) data. Therefore, some systems supply a training signal to measure a channel before data decoding begins.

However, the channel can change, for example, as either the transmitter or receiver moves in space, or the clocks drift. Hence, many systems continue to send more "known" data along with the "unknown" data in order to track the slow changes in the channel. For the purpose of describing the present system, it will be assumed that pilot signals are a subset of a more general class of training signals. That is, as used herein, training signals refer to both an initial training sequence, as well as the tracking training sequence referred to pilot tones in a UWB or 802.11 system. Alternately stated, the terms "initial training" and "tracking training" or "pilot tones", are all types of training signals.

In one aspect then, the transmitter 304 sends a message where the quadrature modulated communication data is a beacon signal, sent at a beacon data rate, following the rotating training signal. That is, the beacon signals used by many communication systems can be transmitted with a rotating training signal. Further, the transmitter 304 may alternately, or in addition, send a message with quadrature modulated communication data at a communication data rate, greater than the beacon data rate, following a rotating training signal.

In one aspect, the transmitter may send a combination of messages with rotating and non-rotating training signals. For example, the transmitter 304 may send multi-burst messages that include a balanced message, following an unbalanced message. For the sake of brevity, the phase "balanced message" is used to describe a message that includes both a rotating training signal and quadrature modulated communication data. An unbalanced message is a message comprising a non-rotating training signal where training information is sent via the I modulation path, for example, but not sent via the Q modulation path. In this aspect, the unbalanced message also includes a message format signal, embedded in the header for example, indicating that a balanced message (with a rotating training signal) is sent subsequent to the unbalanced message. The unbalanced message includes quadrature modulated communication data, which may be sent subsequent to the message format signal, in the payload. However, the system is not limited to any particular temporal relationship between training signal, message format signal, and quadrature modulated data. For example, the unbalanced message may be a beacon signal or initial training message. Alternately, the unbalanced message may be sent subsequent to the balanced message, or unbalanced messages may be interspersed with balanced messages.

Figure 4C:
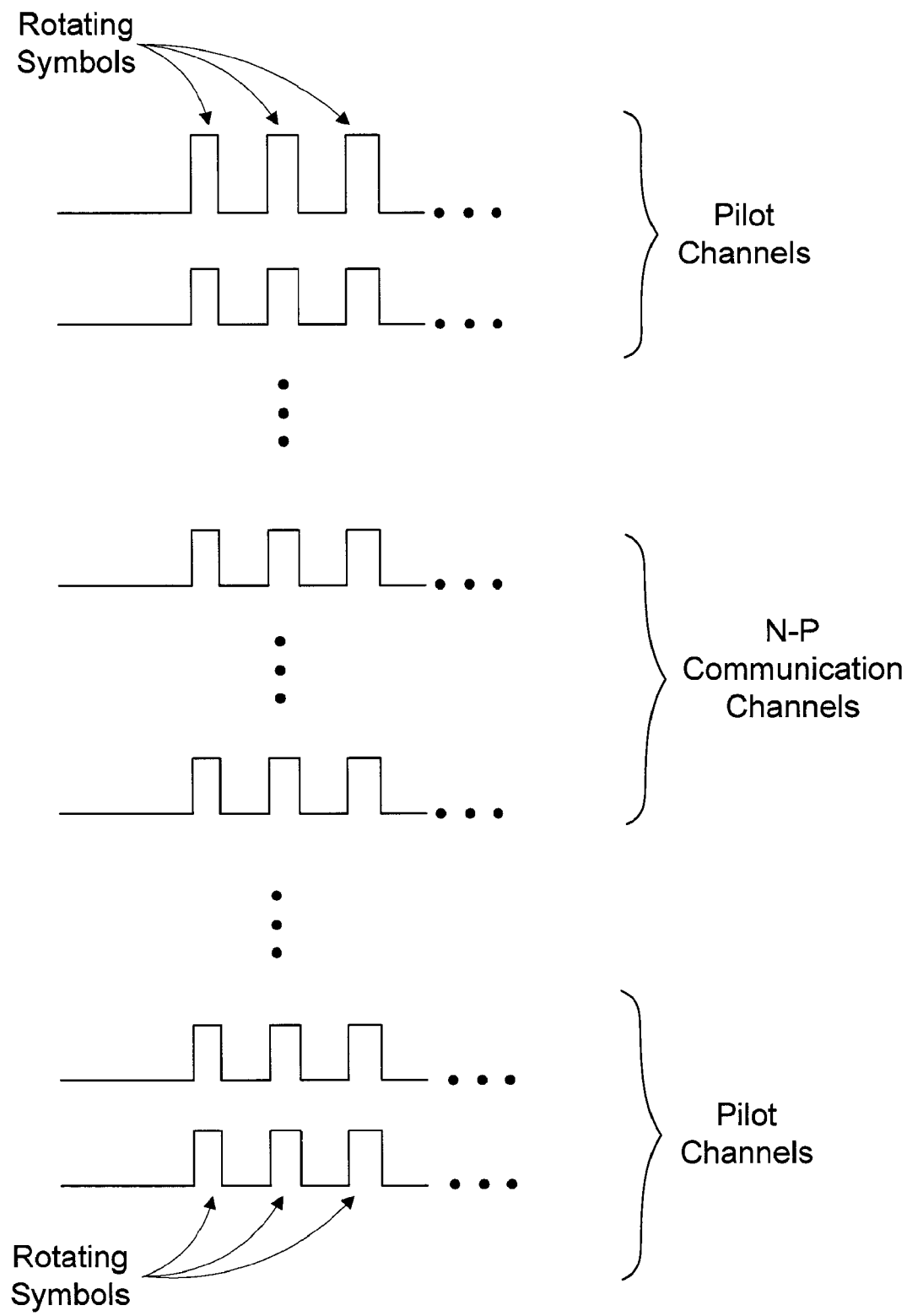

Considering FIG. 4C, many communications systems, such as those compliant with IEEE 802.11 and UWB, use a plurality of subcarriers that are simultaneously transmitted. In this aspect the rotating training signal may be enabled in the form of pilot signals. For example, P rotating pilot symbols may be generated with (N-P) quadrature modulated communication data symbols. Each rotating pilot symbol includes training information that changes by 90 degrees every symbol. Thus, a balanced message, with a rotating training signal, is sent by simultaneously transmitting N symbols. In other aspects, less than P rotating pilot symbols are used, as some of the pilot symbols are non-rotating symbols.

Figure 4D:
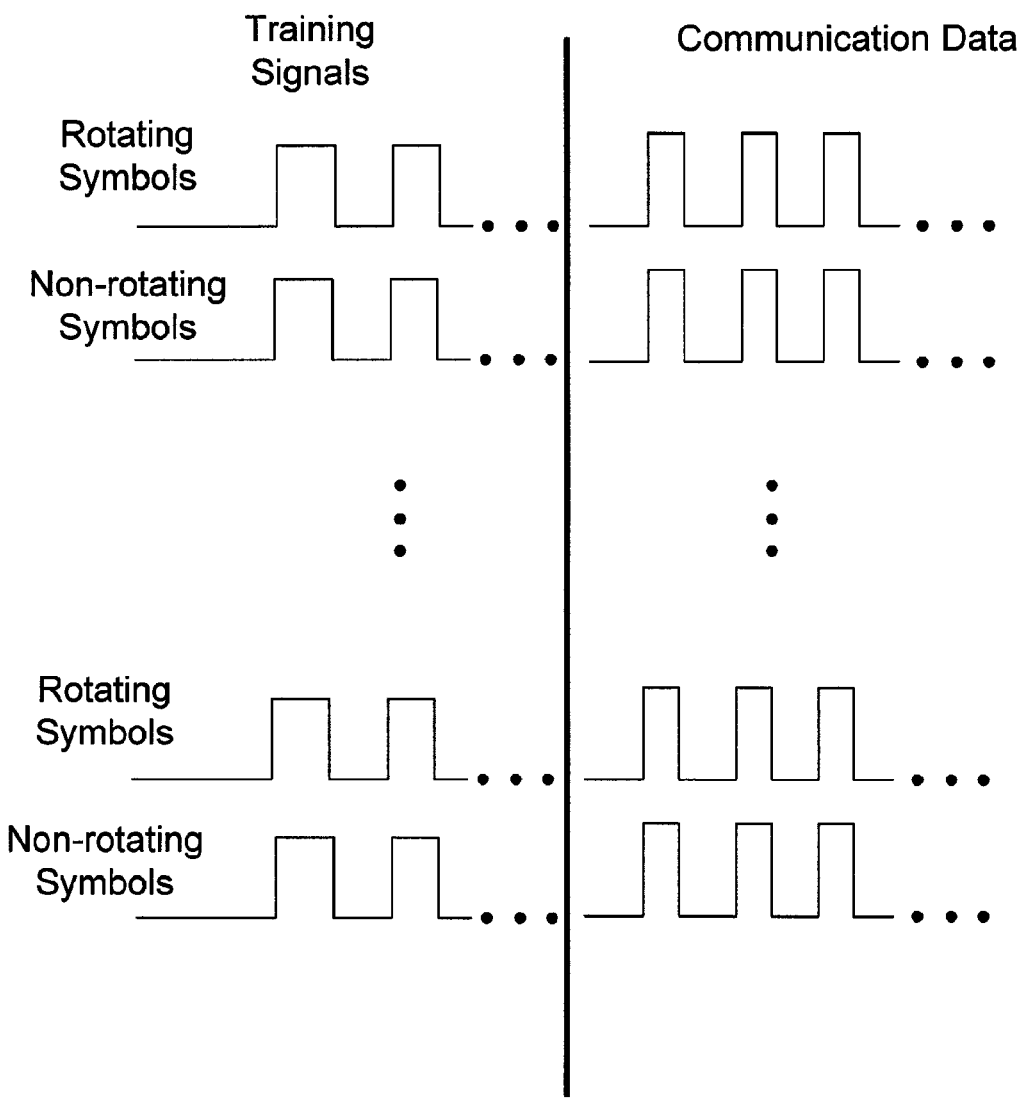

Considering FIG. 4D, in a different aspect of a multi-subcarrier system, the rotating training signal includes symbols simultaneously generated for a plurality of subcarriers using training information sent via the I modulation path, but not the Q modulation path, for i subcarriers. Further, the training signal uses training information sent via the Q modulation path, but not the I modulation path, for j subcarriers. Then, IQ modulated communication data is generated for the i and j subcarriers subsequent to the generation of the training information. In one aspect the subset of i subcarriers includes "paired subcarriers" or "paired tones", which is a pair of tones at frequency −f and frequency +f. Likewise, tones in the subset j can be paired. The pairing of tones at −f and +f aids in the achievement of I channel training, Q channel training, and rotation training.

If the sequence of training symbols through any particular subcarrier does not rotate by 90 degrees, this system may still be considered as generating a rotating training signal, since a channel estimation averaging technique may be used at the receiver to average adjacent subcarriers. Then, the overall effect of using adjacent non-rotating I and Q training symbols is a rotating training signal. In one aspect, the training signal is designed so that the odd-numbered subcarriers use non-rotating training symbols sent through the I modulation path (channel X), and the even-numbered subcarriers use the Q modulation path (channel X+90 degrees).

In another aspect of the invention, the wireless communications device 300 of FIG. 3 can be considered as comprising a means 308/310 for rotating a training signal using the I and Q modulation paths, and a means 308/310 for generating quadrature modulated communication data. As above, the training signal may be pilot symbols sent simultaneously with communication data, or the communication data may be sent subsequent to the rotating training signal. Further, the device 300 includes a means 320/322 for transmitting as an RF communication.

Likewise, an unbalanced message may be generated, with quadrature modulation means 308/310 being used to generate the following: a non-rotating training signal with training information sent via the I modulation path, but no training information sent via the Q modulation path; a message format signal indicating that a balanced message (with a rotating training signal) is to be sent subsequent to the unbalanced message; and, quadrature modulating communication data.

Figure 7:
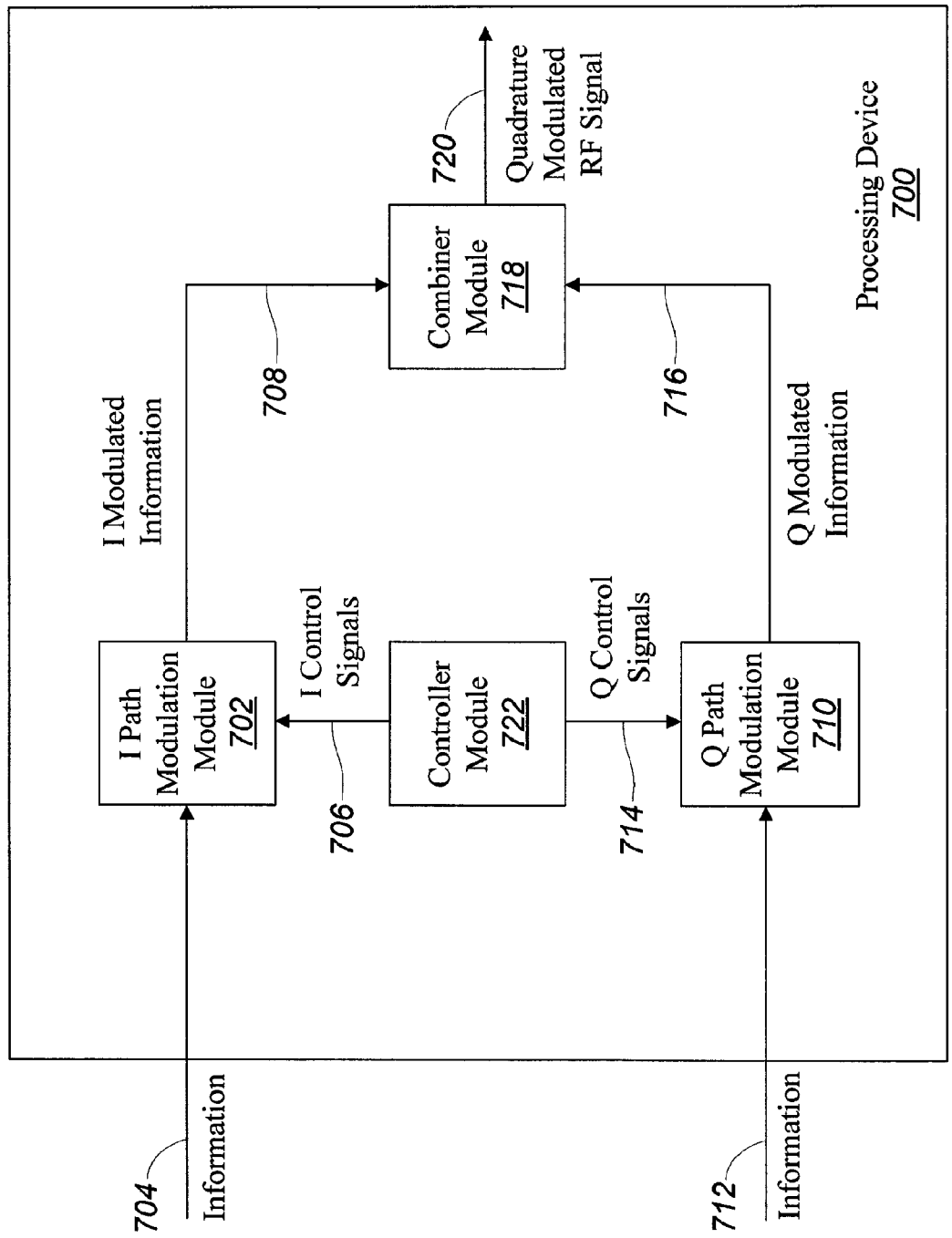
FIG. 7 is a schematic block diagram depicting a processing device for transmitting a quadrature modulation rotating training sequence.

FIG. 7 is a schematic block diagram depicting a processing device for transmitting a quadrature modulation rotating training sequence. The processing device 700 comprises an I path modulation module 702 having an input on line 704 to accept information and an input on line 706 to accept I control signals. The I path modulation module 702 has an output on line 708 to supply I modulated information. A Q path modulation module 710 has an input on line 712 to accept information and an input on line 714 to accept Q control signals. The Q path modulation module 710 has an output on line 716 to supply Q modulated information.

A combiner module 718 has inputs on lines 708 and 716 to accept the I and Q modulated information, respectively, and an output on line 720 to supply a quadrature modulated RF signal. A controller module 722 has outputs on lines 706 and 714 to supply the I and Q control signals, respectively. The controller module 722 uses the I and Q control signals to generate a message with a rotating training signal including training information sent via the I modulation path and training information sent via the Q modulation path, as well as quadrature modulated communication data. The functions performed by the above-mentioned modules are similar to those performed by the device of FIG. 3, and will not be repeated here in the interest of brevity.

Functional Description

As described above, the present invention rotating training signal may be used to modify conventional systems that use only the I modulation path for training in an effort to save power. Such a system can be modified by momentarily enabling the Q modulation path during the second part of the training sequence. This solution uses only slightly more power, while stimulating both I and Q channels during the training sequence.

Alternately, the unbalanced message with the non-rotating training signal can be used for a beacon, while balanced messages, with rotating training signals are used for high data rates. This solution may require that a receiver be programmed to associate rotating training signal messages with high data rates and unbalanced messages with beacons. To eliminate the need for a receiver to "guess" the type of training signal to be received, information can be embedded in the preamble to inform the receiver of the type of training sequence that is to follow.

In another variation, a conventional unbalanced message can be used as the first burst in a multi-burst transmission. With multi-burst transmissions, the receiver can easily be informed, in each burst, of the type of training sequence that is to appear in the following burst. Typically then, the first burst can be an unbalanced message, with all the subsequent bursts being balanced messages. These messages may be optionally enabled, used only for example, if they are supported by both the transmitter and receiver. In this manner, the invention can be made backward compatible with existing devices.

Another solution, which is not backward compatible, is to modify all training sequences, including the beacon's training sequence, such that training sequences are always balanced. In this variation the receiver does not have to operate on two different types of training signals.

By way of illustration, an analysis is presented below of the improvements that can be obtained in a conventional UWB-OFDM system, by adding balanced messages with rotating training signals. Conventionally, the training sequence is a repeated OFDM symbol. This means that the same constellation point is transmitted repeatedly for each subcarrier. A unique direction in the constellation (e.g., I path) is stimulated while the other direction (e.g., Q path) is not. The errors associated with such a system have been presented above in the BACKGROUND Section, above.

Figure 1:
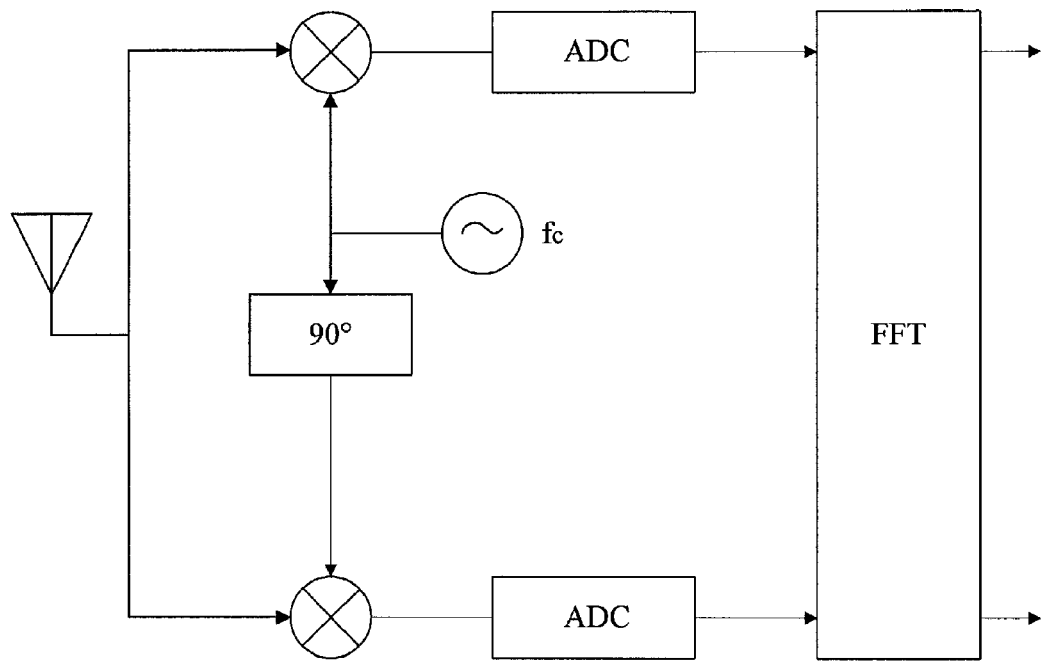
FIG. 1 is a schematic block diagram of a conventional receiver front end (prior art).
Figure 2:
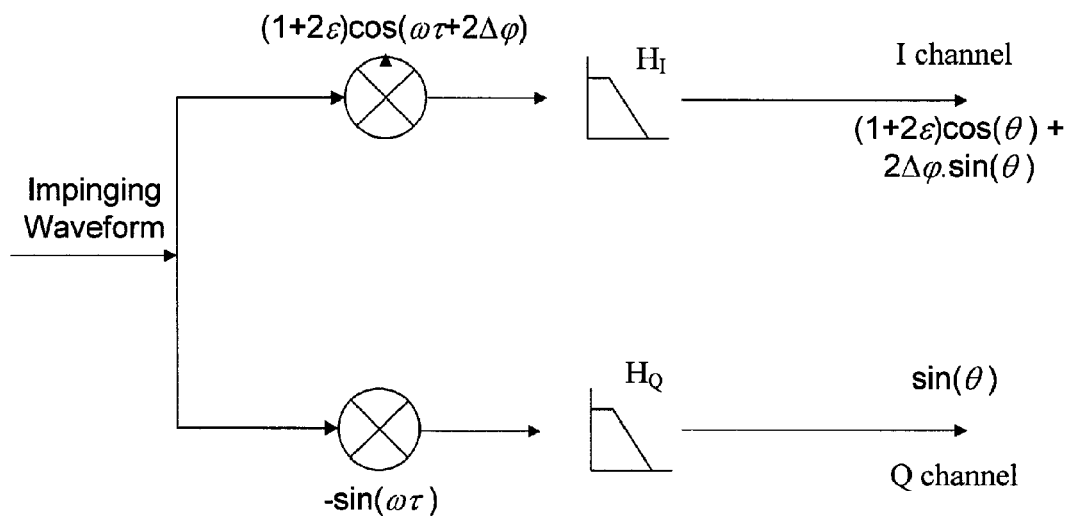
FIG. 2 is a schematic diagram illustrating quadrature imbalance at the receiver side (prior art).
Figure 8:
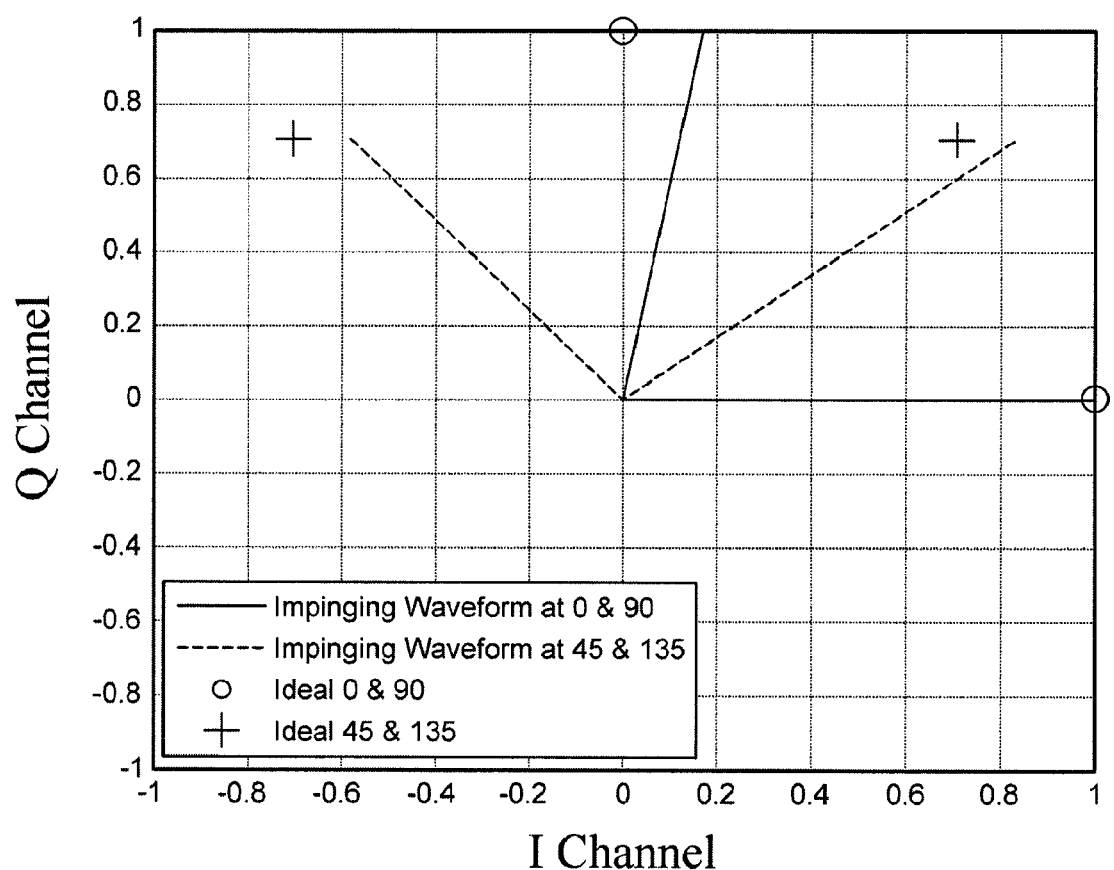
FIG. 8 is a diagram depicting ideal and imbalanced constellations for 2 different phases θ of the impinging waveform of FIG. 2.

FIG. 8 is a diagram depicting ideal and imbalanced constellations for 2 different phases θ of the impinging waveform of FIG. 2. The phase imbalance is $2\Delta\phi=10$ degrees (with no amplitude imbalance). Note: the imbalance is strongest when the angles are 0 and 90 degrees but is nearly absent when the angles are 45 and 135 degrees. This is because the imbalance self compensates around 45 degrees when the phase of the impinging wave is halfway between the I and Q paths. The angle of the impinging waveform depends on the both the data and the channel and can take any value between 0 and 360 degrees.

Assuming that the impinging waveform has an angle such that all the training symbols are aligned with the I direction (θ=0), for instance, then the I direction will be precisely estimated, with 0 degrees of error. But, the Q direction will be off by 10 degrees. In average while Gaussian noise (AWGN), this results in excessive errors for the constellation points lying in the Q direction. If, on the other hand, the impinging waveform has an angle of θ=45 degrees (halfway between I and Q), then the imbalance is near absent.

Figure 9:
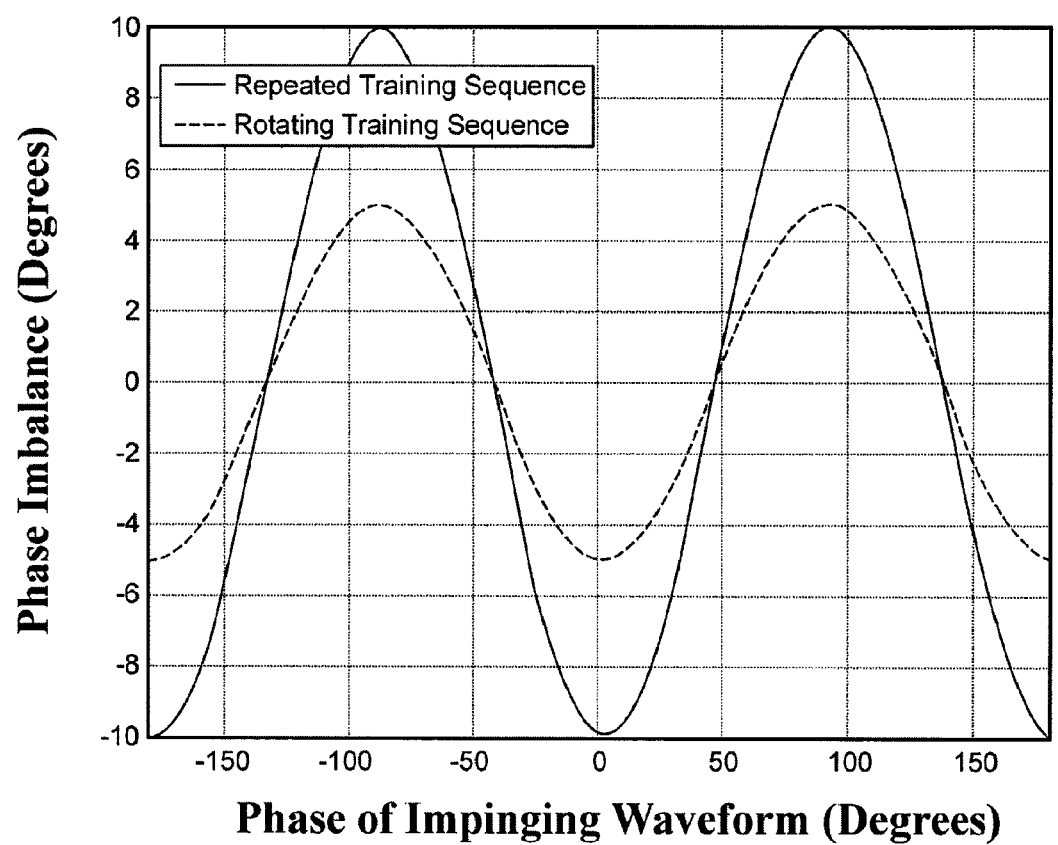
FIG. 9 is a graph depicting phase imbalance as a function of the phase on the impinging waveform.

FIG. 9 is a graph depicting phase imbalance as a function of the phase on the impinging waveform. The solid line on the figure below shows the phase imbalance in the case of a repeated training sequence. The dotted line shows the case of the rotating training sequence. In AWGN and for uncoded QPSK at a BER of $10^{-5}$, the loss is between 0 dB and 1.5 dB for an imbalance varying between 0 and 10 degrees (depending on the phase of the impinging waveform).

Analysis can begin with the simpler problem of time domain modulations such as Time Division Multiple Access (TDMA) or Code Division Multiple Access (CDMA) in AWGN. A training sequence is assumed with all the symbols lying on the I axis (I channel). After transmission through an AWGN channel, the axis can rotate to a direction X in the quadrature 2D plane (depending on the channel phase). By having all the training symbols aligned with a direction X, then direction X is properly estimated and any data symbol in that direction lies on the proper axis (after rotation). However, the symbols in the orthogonal direction Y will be off by $2\Delta\phi$ degrees from the ideal position. They will incur significantly more errors.

Since all training symbols lie on the X axis, the channel estimate is H=angle(X).

The error in the direction of X is angle(X)−H=0.

The error in the direction of Y is angle(Y)−90°−H=$2\Delta\phi$.

This analysis assumes that the training sequence constantly rotates, such that the I and Q channels are equally stimulated. In this case, the average channel has a phase that is no longer exclusively aligned with the X direction. It will also be aligned with the Y direction, half of the time.

The channel estimate is now H=[angle(X)+angle(Y)−90°]/2.

The error in the direction of X is angle(X)−H=−$2\Delta\phi$/2.

The error in the direction of Y is angle(Y)−90°−H=$2\Delta\phi$/2.

The dotted line curve in the figure shows the phase imbalance in each direction. The dotted line curve is essentially 0.5 times the solid line curve.

Each direction X and Y now shares half of the quadrature imbalance burden. The loss is 0 to 0.5 dB corresponding to 5 degrees maximum imbalance on each axis. The gain varies between 0 and 1 dB. Note: in the presence of a LOS channel (AWGN), most carriers can be aligned at the same phase and degraded by 1.5 dB for the repeated training sequence case. In the same scenario, the degradation is only 0.5 dB for the rotating training sequence, which is a 1 dB gain. However, as the phase noise and/or the frequency offset residual changes the phase of the impinging waveform, the phase imbalance varies between 0 and 10 degrees. The error is partly smoothed. But for high data rates, diversity may not be enough to compensate for the excessive error that regularly hits the subcarriers. The effect on high data rates is more important.

An implementation of a rotating training sequence does not necessarily imply any greater hardware complexity in a receiver or transmitter. At the receiver, rotation by 90 degrees before accumulation is performed by swapping the I and Q channels, and sign-inverting one of them. This operation can be done either in the time domain (if all frequencies are rotated the same way) or in the Fourier domain, which is the more general case.

Using the notation of the 2003 IEEE publication, *Compensation of IQ imbalance in OFDM systems*, by Jan Tubbax et al., the authors reference the imbalance halfway between the I and Q channel, so that rather than having an imbalance of $2\Delta\phi$ and $2\epsilon$ on the I channel, an imbalance of $\Delta\phi$ and $\epsilon$ is obtained on each of I and Q.

The quadrature imbalance distorted received signal, in the absence of any channel and noise, can be expressed in terms of the transmitted signal by $$y=\alpha x+\beta x^*$$

where x is the complex transmitted signal, x* its complex conjugate, y the complex received signal, and $\alpha \approx 1$ and $\beta \approx 0$ are complex quantities that characterize the quadrature imbalance distortion. They are given by $$\alpha=\cos\Delta\phi+j\epsilon.\sin\Delta\phi$$

$$\beta=\epsilon.\cos\Delta\phi-j\sin\Delta\phi$$

When they are equal to 1 and 0 respectively, the received signal is identical to the transmitted signal.

The time domain modulation case in AWGN will be revisited using this more formal description. In the absence of noise, but in the presence of an AWGN channel with coefficient c, the received signal before the imbalance is cx, and after the imbalance it is $$y=\alpha cx+\beta c^*x^*$$

Biased Training Sequence

If a training sequence is sent consisting of the symbols ±u, i.e., always aligned with the unique direction of u in the 2D plane, then 2 possible received symbols are obtained $$y=\alpha cu+\beta c^*u^*$$

$$y=-\alpha cu-\beta c^*u$$

Assuming for the sake of simplicity, but without loss of generality, that the vector u is unitary, to estimate the channel a digital de-rotation of +u* and −u* are respectively applied to obtain the channel estimate $$\alpha c+\beta c^*u^{*2}$$

On the left hand side of the addition operator, the channel (or nearly) is obtained, but on the right hand side a noise or bias occurs. This noise does not vanish as more and more training symbols are averaged: it remains as only the white noise vanishes. Hence, the estimate of the channel is biased if a training sequence is transmitted that is exclusively aligned with the symbol u.

When transmission of the data x is started, the metric that goes into a Viterbi decoder for example, is obtained by multiplying the complex conjugate of the channel (channel's match filter) to the received signal. Hence $$\text{Metric}=[\alpha c+\beta c^*u^{*2}]^*y=[\alpha c+\beta c^*u^{*2}]^*[\alpha cx+\beta c^*x]$$

And after eliminating some of the second order quantities $$\text{Metric}=|\alpha|^2|c|^2x+\alpha\beta|c|^2x^*+\alpha\beta^*c^2u^2x$$

The first component in the metric formula above is ideally a positive real scalar, proportional to the channel energy, which multiplies the original constellation point. But the second and third components of that formula are undesired noises created by the bias. Their noise variance is identical and equal to $$|\alpha|^2|\beta|^2|c|^4|x|^2$$

And the signal-to-noise ratio (SNR) in the absence of other source of noise is $$SNR = |\alpha|^4|c|^4|x|^2/2|\alpha|^2|\beta|^2|c|^4|x|^2$$

$$= |\alpha|^2/2|\beta|^2$$

$$\approx 0.5/[\varepsilon^2+\Delta\varphi^2]$$

This noise does not have the distribution of white Gaussian noise, but if various symbols are arriving from different independent channels $c_i$ (multi-paths in CDMA, or interleaving, etc), after the symbols are combined, a slow convergence to white Gaussian noise is obtained. This SNR can be of the order of 10 to 20 dB. For data rates running at low SNRs this additional noise may not be an issue. But for high data rates running at high SNR, this additional noise has a significant impact.

Unbiased Training Sequence

If, rather than sending the entire training sequence aligned with the unique direction of u, half of the symbols are transmitted aligned with an orthogonal direction to u, denoted by v, then an average the channel estimate is obtained of:

$$ac+\beta c^*(u^{*2}+v^{*2})=ac$$

The right-hand side bias vanishes because $u^{*2}+v^{*2}=0$ when these two unitary vectors are orthogonal. Now the metric is $$\text{Metric}=|a|^2|c|^2x+a\beta|c|^2x^*$$

Half of the quadrature imbalance noise is gone. The SNR (in the absence of noise) is improved by 3 dB.

$$SNR = |\alpha|^2/|\beta|^2$$
$$\approx 1/[\varepsilon^2 + \Delta\varphi^2]$$

OFDM

In OFDM, the formula for the received symbol is a little changed, except that the entire OFDM symbol must be considered as a vector of symbols, $$y=\text{FFT}\{\alpha\text{IFFT}(c\cdot x)+\beta[\text{IFFT}(c\cdot x)]^*\}$$

where vectors are denoted in boldface and where the (·) operation is the element-wise product between two vectors. The channel c is the Fourier domain version of the channel. This equation can be rewritten as $$y = \alpha c \cdot x + \beta(c \cdot x)_{m^*}$$
$$= \alpha c \cdot x + \beta(c_{m^*} \cdot x_{m^*})$$

where index m denotes the vector mirrored over the sub-carriers. The only contributors to the received symbol at frequency +f are the channels and symbols at the symmetric frequencies +f and −f. The two symmetric sub-carriers, +f and −f can be isolated and the received symbol for sub-carrier +f written as $$y=acx+\beta c_m^* x_m^*$$

where the index m denotes the channel or symbol at frequency −f. The main difference between this formula and the formula for TDMA or CDMA is that the distortion is now created by the channel and signal at a different frequency, namely frequency −f. This can have significant impact on a particular received symbol if the symmetric frequency has a much stronger channel, or much stronger signal. Hence, things can be more problematic in OFDM.

Biased Training Sequence

Assuming that the pilot tone transmitted at frequency +f is u and the pilot tone transmitted at frequency −f is $u_m$, a biased training sequence does not properly rotate the pilot tones, thereby introducing a bias in the channel estimate $$ac+\beta c_m^* u_m^* u^*$$

Then, the received metric at frequency +f can be written as $$\text{Metric}(+f)=|a|^2|c|^2x+a^*\beta c^* c_m^* x_m^*+a\beta^* cuc_m u_m x+$$
$$|\beta|^2|c_m|^2 u_m u x_m^*$$

The $4^{th}$ (noisy) term in the formula above can no longer be neglected, since the channel $|c_m|^2$ can be very strong. The noisy terms now depend on the strength of the channel at frequency −f and can be significant. The frequency −f acts as an interferer that can confuse the Viterbi decoder, which may sometimes interpret a weak metric with plenty of interference as a good metric.

Unbiased Training Sequence

For the unbiased training sequence, the channel estimate is ac and the 2 noisy terms are eliminated from the equation to obtain $$\text{Metric}(+f)=|a|^2|c|^2x+a^*\beta c^* c_m^* x_m^*$$

The improvement is clear. However, it is difficult to assess the benefit for the 480 megabytes per second (Mbps) data rate in UWB-OFDM without simulation in a realistic channel model. Note that for such high data rates, the devices are expected to have an LOS or a near LOS and hence the variations of the channel at frequencies +f and −f are not expected to be too large. But a 3 dB or more difference in channel strength is very likely.

Transmitter's Quadrature Imbalance

Quadrature imbalance is also present at the transmitter side and adds to the distortion. If a' and β' are denoted as the imbalance coefficients at the transmitter side, then the output of the transmitter can be written as $$z=a'x+\beta'x^*$$

and the receiver obtains after the channel c and the distortion a, β, $$y = \alpha\ c\ z + \beta\ c^* z^*$$
$$= (\alpha\alpha'c + \beta\beta'^* c^*)x + (\alpha\beta'c + \alpha'^*\beta c^*)x^*$$
$$= a(c, c^*)x + b(c, c^*)x^*$$

The above analysis applies to TDMA/CDMA, but also to OFDM if $c^*$ is replaced with $c_m^*$, and $x^*$ with $x_m^*$ (i.e., the values at frequency −f).

The problem of quadrature imbalance at both transmitter and receiver remains the same as previously studied but with different values for the imbalance coefficients that are function of the channel. If second order quantities are neglected, and assuming $c_m^*$ is not excessively stronger or weaker than c, then $$y\approx a'cx+(\beta'c+\beta c^*)x^*$$

The noise from distortion is increased. Using the unbiased training sequence helps eliminate some of the terms contributing to the noise on the metrics, as explained above.

Transmitting an unbiased training sequence can be achieved in a conventional UWB system by transmitting the first part of the training sequence using the I path and the second part on the Q path. Even if an unbiased (non-rotating training signal) is used for beaconing, to save power by turning off the Q channel, a special signal embedded in the preamble can inform the receiver of the type of training sequence. Alternately, the receiver can automatically detect the training sequence that is transmitted. This is not a difficult task, as it is enough to look at a few strong sub-carriers to decide if the transmission was identical or rotated by 90 degrees.

As noted earlier, pilot tones are considered to be a special case of training signals, since many conventional systems use pilots that are transmitted in a unique direction in the complex plane. As the pilot tones are tracked, a bias is constantly introduced along that direction. Better pilots are obtained by changing them every OFDM symbol by 90 degrees, or within the same OFDM symbol, rotating some paired (±f) subcarriers by 90 degrees with respect to other paired subcarriers (on different frequencies). This change in pilot tones is simple and has almost a zero cost. As the clocks between transmitters and receivers drift, the pilot tones may have the potential of compensating for some of the bias introduced with the initial biased training sequence when an unbalanced training signal is used. In other words, generating just rotating pilot tones, while keeping a biased (non-rotating) training sequence, reduces bias in most circumstances.

Simulations have been run to measure the effect of quadrature imbalance with, and without a balanced training sequence. For an imbalance on the TX side of 10% in amplitude (0.4 dB) and 10 degrees in phase, and for the same amount of imbalance on the receiver side, the gain for the highest data rate (480 Mbps) is nearly 1 dB. Even larger gains can be expected if more types of loss are introduced that result in a requirement for higher SNR. The higher the SNR, the more gain that can be obtained using a balanced training sequence.

Figure 10:
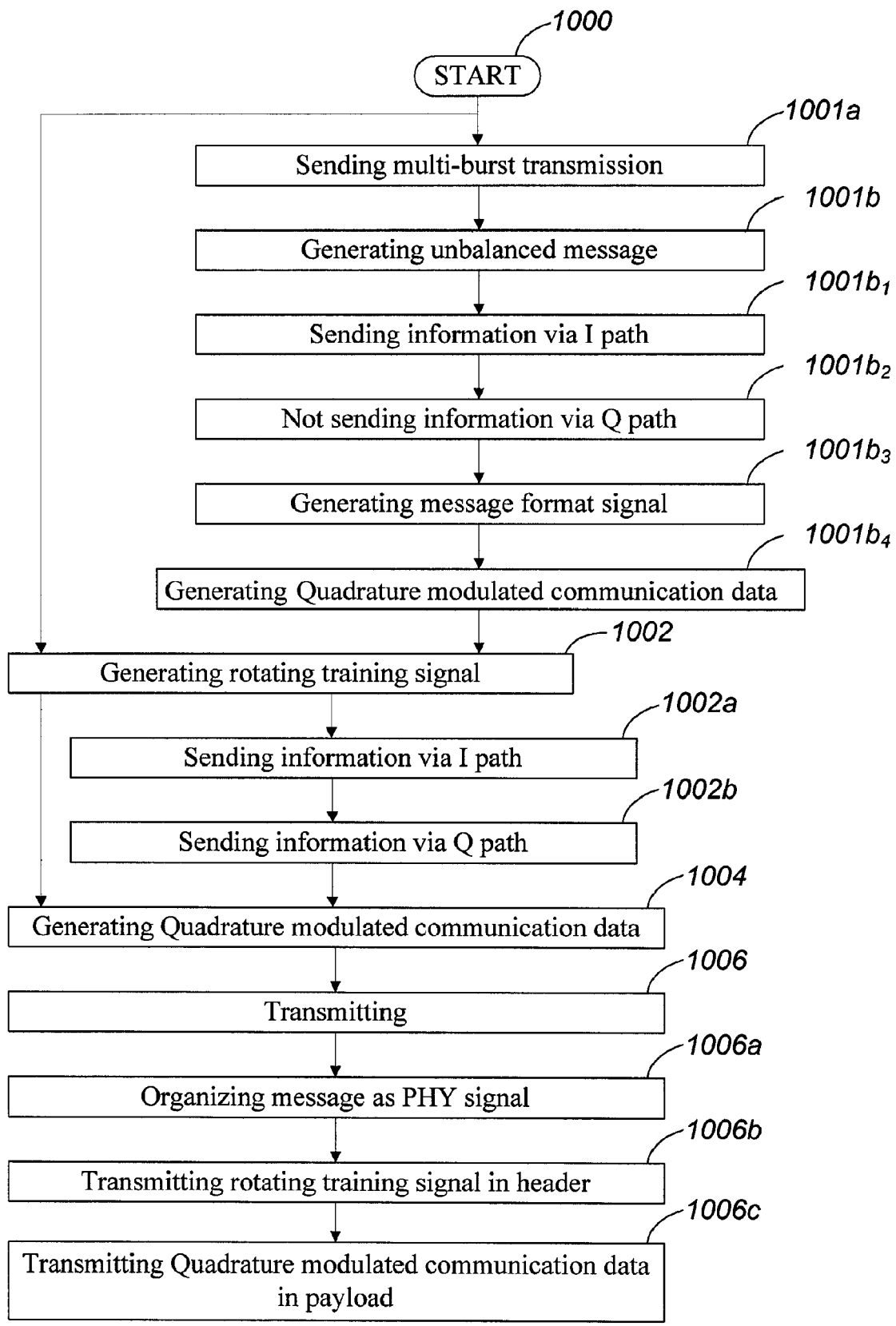
FIG. 10 is a flowchart illustrating a method for transmitting a communications training sequence.

FIG. 10 is a flowchart illustrating a method for transmitting a communications training sequence. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1000.

Step 1002 generates a rotating training signal in an quadrature modulation transmitter. Typically, predetermined or known information is sent as the training signal. Step 1002a sends training information via an I modulation path, and Step 1002b sends training information via a Q modulation path. Step 1004 generates quadrature modulated communication data. Step 1004 may be performed subsequent to Step 1002, or simultaneous with the performance of Step 1002. In one aspect, Step 1004 generates a beacon signal at a beacon data rate. Alternately, Step 1004 generates information at a communication data rate, greater than the beacon data rate. Step 1006 transmits the rotating training signal and quadrature modulated communication data. Typically, the generation and transmission of symbols or information occurs almost simultaneously.

In one aspect, transmitting the rotating training signal in Step 1006 includes initially sending training information via the I modulation path, and subsequently sending training information via the Q modulation path. For example, initially generating training information via the I modulation path (Step 1002a) may include energizing the I modulation path, but not energizing the Q modulation path. Then, generating training information via the Q modulation path, subsequent to generating training information via the I modulation path, includes energizing the Q modulation path. Alternately, the training information may be sent in the opposite order. More explicitly, generating training information via the I modulation path in Step 1002a may include generating a first symbol having a reference phase. Then, generating training information via the Q modulation path in Step 1002b includes generating a second symbol having a phase of the reference phase +90 degrees, or the reference phase −90 degrees.

In another aspect, Step 1002b generates training information via the Q modulation path using the following substeps (not shown). Step 1002b1 generates training information simultaneously through both the I and Q modulation paths, and Step 1002b2 combines I and Q modulated signals to supply the second symbol. Alternately or in addition, generating training information via the I modulation path may include substeps (not shown). Step 1002a1 generates training information simultaneously through both the I and Q modulation paths, and Step 1002a2 combines I and Q modulated signals to supply the first symbol.

In a different aspect, transmitting (Step 1006) includes substeps. Step 1006a organizes a physical layer (PHY) signal including a preamble, header, and payload. Note, this organization typically occurs as a response to receiving the information to be transmitted in a corresponding MAC format. Step 1006b transmits the rotating training signal in the PHY header, and Step 1006c transmits the IQ modulated communication data in the PHY payload.

In another aspect, Step 1001a sends a multi-burst transmission with an unbalanced message (Step 1001b) followed by the rotating training signal (Step 1006). The unbalanced, or imbalanced message includes a non-rotating training signal with training information sent via the I modulation path (Step 1001b1), but no training information sent via the Q modulation path (Step 1001b2). The unbalanced message includes a generated message format signal (Step 1001b3) indicating that a rotating training signal is sent subsequent to the unbalanced message. Quadrature modulated communication data is generated in Step 1001b4. In a different aspect, generating a rotating training signal in Step 1002 includes generating P rotating pilot symbols, and generating quadrature modulated communication data in Step 1004 includes generating (N-P) communication data symbols. Then, transmitting in Step 1006 includes simultaneously transmitting N symbols.

In another variation, generating a rotating training signal in Step 1002 includes simultaneously generating symbols for a plurality of subcarriers. More explicitly, Step 1002a uses training information sent via the I modulation path, but not the Q modulation path, for i subcarriers. Step 1002b uses training information sent via the Q modulation path, but not the I modulation path, for j subcarriers. Then, generating quadrature modulated communication data in Step 1004 includes generating quadrature modulated communication data for the i and j subcarriers subsequent to the generation of the training information. In one aspect, each i subcarrier is adjacent a j subcarrier.

More formally, the channel estimated by subcarrier i is $$ac + \beta c_m^* u_m^* u^* \qquad (1)$$

Nearly the same channel is estimated by the adjacent subcarrier j with a 90 degrees rotated pilot as $$ac + \beta c_m^* j u_m^* j u^* = ac - \beta c_m^* u_m^* u \qquad (2)$$

Note: the symbol for complex numbers j in the equation should not be confused with the subset j. Then, after averaging over the subcarriers, i.e., after averaging the results of (1) and (2), the bias is automatically canceled.

The above-described flowchart may also be interpreted as an expression of a machine-readable medium having stored thereon instructions for transmitting a quadrature modulation rotating training sequence. The instructions for transmitting a rotating training signal would correspond to Steps 1000 through 1006, as explained above.

Systems, methods, devices, and processors have been presented to enable the transmission of quadrature modulated rotating training signals in a wireless communications device transmitter. Examples of particular communications protocols and formats have been given to illustrate the invention. However, the invention is not limited to merely these examples. Other variations and embodiments of the invention will occur to those skilled in the art.

What is claimed is:

1. A method for transmitting a communications training sequence, the method comprising:

generating a training sequence in a quadrature modulation transmitter, the training sequence representing at least a first symbol representing a first complex value immediately followed by a second symbol representing a second complex value immediately followed by a third symbol representing a third complex value, wherein the first complex value and the second complex value define a first angle, wherein the second complex value and the third complex value define a second angle, and wherein the first angle and second angle are equal and less than 180 degrees;

transmitting the training sequence in a manner that energizes an in-phase (I) modulation path but not energizing a quadrature (Q) modulation path for a first time, and energizing the Q modulation path but not energizing the I modulation path for a second time different from the first time;

generating an unbalanced message that contains data; and transmitting the unbalanced message, either before, after, or concurrently with the training sequence, the unbalanced message comprising a message format signal indicating how the training sequence is sent relative to the unbalanced message.

2. The method of claim 1 wherein transmitting the training sequence comprises transmitting, at different times, training information via the in-phase modulation path and training information via the quadrature modulation path.

3. The method of claim 1 further comprising generating quadrature modulated communication data and transmitting the quadrature modulated communication data, wherein generating the quadrature modulated communication data includes generating data selected from a group consisting of a beacon signal generated at a beacon data rate and communication data generated at a communication data rate, greater than the beacon data rate.

4. The method of claim 1 wherein generating a training sequence includes generating symbols for a plurality of subcarriers.

5. The method of claim 1 wherein generating a training sequence comprises:

generating training information for both in-phase and quadrature modulation paths; and combining the training information for both the in-phase and quadrature modulation paths to generate the training sequence.

6. The method of claim 1 further comprising generating quadrature modulated communication data and transmitting the quadrature modulated communication data, wherein transmitting the training signal and quadrature modulated communication data includes:

organizing a physical layer (PHY) signal including a preamble, header, and payload; transmitting the training signal in the PHY header; and transmitting the quadrature modulated communication data in the PHY payload.

7. A processing device for transmitting a communications training sequence, the processing device comprising:

a generating module configured to generate a training sequence representing at least a first symbol representing a first complex value immediately followed by a second symbol representing a second complex value immediately followed by a third symbol representing a third complex value, wherein the first complex value and the second complex value define a first angle, wherein the second complex value and the third complex value define a second angle, and wherein the first angle and second angle are equal and less than 180 degrees;

a transmission module for transmitting the training sequence in a manner that energizes an in-phase (I) modulation path but not energizing a quadrature (Q) modulation path for a first time, and energizing the Q modulation path but not energizing the I modulation path for a second time different from the first time;

wherein the generating module is configured to generate an unbalanced message that contains data; and wherein the transmission module is configured to transmit the unbalanced message, either before, after, or concurrently with the training sequence, the unbalanced message comprising a message format signal indicating how the training sequence is sent relative to the unbalanced message.

8. A system for transmitting a communications training sequence, the system comprising:

a processor configured to generate a training sequence representing at least a first symbol representing a first complex value immediately followed by a second symbol representing a second complex value immediately followed by a third symbol representing a third complex value, wherein the first complex value and the second complex value define a first angle and the second complex value and the third complex value define a second angle, wherein the first angle and second angle are equal and less than 180 degrees; and a transmitter configured to transmit the training sequence in a manner that energizes an in-phase (I) modulation path but not energizing a quadrature (Q) modulation path for a first time, and energizing the Q modulation path but not energizing the I modulation path for a second time different from the first time;

wherein the processor is configured to generate an unbalanced message that contains data; and wherein the transmitter is configured to transmit the unbalanced message, either before, after, or concurrently with the training sequence, the unbalanced message comprising a message format signal indicating how the training sequence is sent relative to the unbalanced message.

9. The system of claim 8 wherein the transmitter transmits the training sequence by transmitting, at different times, training information via the in-phase modulation path and training information via the quadrature modulation path.

10. The system of claim 8 wherein the processor is further configured to generate quadrature modulated communication data, wherein the transmitter is further configured to transmit the quadrature modulated communication data, and wherein the quadrature modulated communication data comprises data selected from a group consisting of a beacon signal generated at a beacon data rate and communication data generated at a rate greater than the beacon data rate.

11. The system of claim 8 wherein the processor is configured to generate a rotating training signal by generating symbols for a plurality of subcarriers.

12. The system of claim 8 wherein the processor is configured to generate a training sequence by generating training information for both in-phase and quadrature modulation paths and combining the training information for both the in-phase and quadrature modulation paths to generate the training sequence.

13. The system of claim 8 wherein the processor is further configured to generate quadrature modulated communication data, wherein the transmitter is further configured to transmit the quadrature communication data, and wherein the training sequence and quadrature modulated communication data are transmitted via a physical layer (PHY) signal including a preamble, header, and payload, with the training sequence in the PHY header and the quadrature modulated communication data in the PHY payload.

14. A non-transitory machine-readable medium having stored thereon instructions for transmitting a communications training sequence, the instructions comprising:

generating a training sequence in a quadrature modulation transmitter, the training sequence representing at least a first symbol representing a first complex value immediately followed by a second symbol representing a second complex value immediately followed by a third symbol representing a third complex value, wherein the first complex value and the second complex value define a first angle, wherein the second complex value and the third complex value define a second angle, and wherein the first angle and second angle are equal and less than 180 degrees; and transmitting the training sequence in a manner that energizes an in-phase (I) modulation path but not energizing a quadrature (Q) modulation path for a first time, and energizing the Q modulation path but not energizing the I modulation path for a second time different from the first time;

generating an unbalanced message that contains data; and transmitting the unbalanced message, either before, after, or concurrently with the training sequence, the unbalanced message comprising a message format signal indicating how the training sequence is sent relative to the unbalanced message.

15. The method of claim 1, wherein the training sequence has an even number of symbols.

16. The method of claim 1, wherein the first angle is 90 degrees.

17. The system of claim 8, wherein the training sequence has an even number of symbols.

18. The system of claim 8, wherein the first angle is 90 degrees.

* * * * *